United States Patent
Yue et al.

(10) Patent No.: US 11,936,468 B2
(45) Date of Patent: Mar. 19, 2024

(54) I/Q DOMAIN MODULATION METHOD, DUAL DOMAIN MODULATION METHOD, AND MULTIPLE ACCESS COMMUNICATION METHOD

(71) Applicant: University of Electronic Science and Technology of China, Chengdu (CN)

(72) Inventors: Guangrong Yue, Chengdu (CN); Daizhong Yu, Chengdu (CN); Lin Yang, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 18/033,379

(22) PCT Filed: Apr. 29, 2021

(86) PCT No.: PCT/CN2021/090976
§ 371 (c)(1),
(2) Date: Apr. 24, 2023

(87) PCT Pub. No.: WO2022/095371
PCT Pub. Date: May 12, 2022

(65) Prior Publication Data
US 2023/0421281 A1    Dec. 28, 2023

(30) Foreign Application Priority Data
Nov. 9, 2020 (CN) .......................... 202011235680.7

(51) Int. Cl.
*H04L 27/28* (2006.01)
*H04J 3/06* (2006.01)
(Continued)

(52) U.S. Cl.
CPC .......... *H04J 3/0682* (2013.01); *H04J 3/0638* (2013.01); *H04L 27/0014* (2013.01);
(Continued)

(58) Field of Classification Search
CPC .................................................. H04L 27/0014
(Continued)

(56) References Cited

U.S. PATENT DOCUMENTS

| 10,601,625 B2* | 3/2020 | Baek .................. H04L 1/04 |
| 2018/0007699 A1* | 1/2018 | Ishii ..................... H04W 72/12 |
| 2018/0076993 A1* | 3/2018 | Seo ..................... H04L 27/2604 |

FOREIGN PATENT DOCUMENTS

| CN | 107026810 A | 8/2017 |
| CN | 107431684 A | 12/2017 |

(Continued)

*Primary Examiner* — Qutbuddin Ghulamali
(74) *Attorney, Agent, or Firm* — Bayramoglu Law Offices LLC

(57) ABSTRACT

A spatial position-dependent I/Q domain modulation method, dual domain modulation method and multiple access communication method are provided. The methods eliminate the dependence of physical layer secure communication on channel state information, and realize the function that a receiver at an expected position can communicate normally, while an eavesdropper at other positions cannot receive a signal or can only receive a wrong signal. The security capability of a wireless communication system is improved from the spatial dimension. The multiple access communication method can realize the distinguishing of multiple users according to precise spatial position points. Even if a plurality of users are located in the same sector in an angular domain, as long as the spatial positions of these users are different, the method can be used to perform multiple access communication, thereby further improving the spatial multiplexing rate of the system and increasing the system capacity.

8 Claims, 1 Drawing Sheet

(51) Int. Cl.
*H04L 27/00* (2006.01)
*H04W 56/00* (2009.01)

(52) U.S. Cl.
CPC ... *H04W 56/004* (2013.01); *H04L 2027/0018* (2013.01); *H04L 2027/0024* (2013.01)

(58) Field of Classification Search
USPC .......................................................... 375/262
See application file for complete search history.

(56) References Cited

FOREIGN PATENT DOCUMENTS

| | | |
|---|---|---|
| CN | 108768912 A | 11/2018 |
| CN | 112104582 A | 12/2020 |

* cited by examiner

I/Q DOMAIN MODULATION METHOD, DUAL DOMAIN MODULATION METHOD, AND MULTIPLE ACCESS COMMUNICATION METHOD

CROSS REFERENCE TO THE RELATED APPLICATIONS

This application is the national phase entry of International Application No. PCT/CN2021/090976, filed on Apr. 29, 2021, which is based upon and claims priority to Chinese Patent Application No. 202011235680.7, filed on Nov. 9, 2020, the entire contents of which are incorporated herein by reference.

TECHNICAL FIELD

The present invention belongs to the technical field of telecommunications, and in particular, relates to an I/Q domain modulation method, a dual domain modulation method, and a multiple access communication method.

BACKGROUND

Traditional wireless communication is always at risk of being intercepted and eavesdropped. Traditional anti-eavesdropping and interception methods include upper-layer encryption and authentication. However, with the ever increasing computing power, the security of upper-layer encryption and authentication technologies is facing unprecedented challenges. Therefore, academia and industry put forward the concept of physical layer secure communications, moving the security gate forward to the physical layer. physical layer secure communications use the rich randomness at the physical layer, and combine the inherent modulation and coding technologies of the physical layer to design a secure communication system in a new dimension and improve the security performance of the system.

In traditional physical layer secure communications, some unique features of the physical layer, such as the channel noise and interference, are often used to achieve secure communications. However, in the specific implementation process, factors such as noise and interference have high uncertainty and are difficult to be controlled and utilized. Most traditional physical layer secure communication technologies achieve the secure communication by utilizing the randomness and spatial difference of wireless channels, but this is usually based on the reciprocity of the channel and channel feedback technologies. However, in general, the channel reciprocity is difficult to be strictly met. For example, in a frequency division duplex (FDD) system, since the round-trip channels are at different frequencies, the reciprocity of the channel is usually not guaranteed. Even in a time division duplex (TDD) system, the fast fading characteristic of the channel can invalidate the reciprocity of the channel. Even in a TDD slow fading channel, when a large number of scatterers are present, since the scatterers incident from different directions will show different scattering characteristics, it is difficult to meet the reciprocity of the channel. The channel feedback technology also has inevitable problems: high-precision channel feedback needs to occupy the reverse channel bandwidth and consume a lot of bandwidth resources. Insufficient channel accuracy will seriously affect the security performance of the system. The biggest problem of channel feedback is that an eavesdropper can wiretap the channel state information of the legitimate communication party by eavesdropping on the reverse channel, thereby cracking the secure communication method that depends on the channel state information.

It is well known that any traditional communication has a delay, and different systems have different delays. Delays will have an important influence (fading, frequency offset, phase rotation and the like) on a signal. In traditional communication methods, the influence of the delay on the signal is compensated through signal processing at the receiver, without using the security value of the delay. In fact, communication delay has high security value. First, the delay has reciprocity. Due to the reversibility of an optical path, the forward propagation delay of electromagnetic waves is equal to the reverse propagation delay. Furthermore, the communication delay is difficult to be eavesdropped, different systems have different delays, and different positions also have different delays. In over-horizon propagation, or when a large number of scatterers are present, radio waves do not propagate in a straight line, and the delay is even more unpredictable. This property of the communication delay ensures the security of the communication system.

Traditional anti-interception and anti-deception methods depend on encryption and authentication technologies above the network layer. However, with the improvement of computing power, upper-layer encryption and authentication technologies are facing severe challenges. For example, it is difficult to manage, distribute and maintain secret keys. Long keys cause high computing overhead and waste of resources, and the improvement of eavesdropping capability imposes great threats on the upper-layer encryption method based on computational complexity. In order to deal with these problems, the physical layer secure communication is proposed. The security gate is moved forward, and the randomness (interference, noise, etc.) of the physical layer is used to get rid of the dependence on long secret keys. However, most of the existing physical layer secure communication technologies depend on the reciprocity of a wireless channel, but the reciprocity of the channel is difficult to be strictly met. Although the existing spatial physical layer security technologies, such as spatial beamforming and direction modulation, can get rid of the limitation of channel reciprocity, only the security performance in the angle domain can be provided. If the eavesdropper and legitimate receiver are located at the same direction, no security is ensured.

Space division multiple access (SDMA) realizes frequency resource multiplexing by marking antenna beams with the same frequency at different directions. SDMA improves the performance of the communication system in many ways. For example, SDMA can reduce inter-channel interference and multi-path fading. More importantly, the SDMA system can double the system capacity, so that the system can support more users with limited spectrum, thereby multiplying the spectrum efficiency. Combined with the smart antenna technology, SDMA divides the space to obtain more user addresses. Using the same time, frequency and code domain resources, different users can be distinguished according to different signal propagation paths in the space, so higher transmission efficiency can be achieved. However, traditional SDMA can only distinguish users in the angle domain. When a plurality of users are located in the same sector, those users cannot be distinguished by spatial beams.

SUMMARY

An objective of the present invention is to overcome the defects mentioned above, and provide a spatial position-dependent I/Q domain modulation method, a dual domain modulation method, and a multiple access communication method.

The technical problems targeted by present invention are solved as follows:

A spatial position-dependent I/Q domain modulation method is based on a transmitter, a receiver and a plurality of channel resources, where the transmitter is configured to process and transmit an original signal, the receiver is configured to recover the original signal, the channel resources are used for the transmitter and the receiver, and the channel resources include time-domain, frequency-domain, spatial-domain and code-domain resources.

The method of the present invention includes the following steps:

S1: performing time synchronization on the transmitter and the receiver to obtain a synchronization time;

S2: performing, by the transmitter, an I/Q domain precoding operation on the original signal to obtain an I/Q domain pre-coded signal, and transmitting, by the transmitter, the I/Q domain pre-coded signal to the receiver using the plurality of channel resources; and S3: receiving, by the receiver, the I/Q domain pre-coded signal to obtain an I/Q domain initial received signal, and performing an I/Q domain matching operation on the I/Q domain initial received signal to obtain an estimate for the original signal.

In S2, the I/Q domain precoding operation includes the following steps:

S2-1: generating, by the transmitter, an I/Q domain high-dimensional precoding signal $\alpha(t+\Delta\tau)$ according to the synchronization time t and a transmission delay $\Delta\tau$ to the receiver:

$$\alpha(t+\Delta\tau) = \begin{bmatrix} \alpha_1(t+\Delta\tau) \\ \alpha_2(t+\Delta\tau) \\ \vdots \\ \alpha_M(t+\Delta\tau) \end{bmatrix}$$

where $\alpha_i(t+\Delta\tau)$ represents the $i^{th}$ dimension of the I/Q domain high-dimensional precoding signal, i=1, 2, ..., M, M represents the number of dimensions of the I/Q domain high-dimensional precoding signal, and M does not exceed the number of the channel resources, $$\alpha_i(t+\Delta\tau) = \prod_{m=1}^{L} \exp[-j2\pi(k_m-1)\Delta f_m(t+\Delta\tau)]$$

where $j=\sqrt{-1}$, $1 \leq m \leq L$, L represents the number of I/Q domain precoding layers, $L \geq 1$, $k_m$ represents an index of the $m^{th}$ layer of I/Q domain precoding branches, $1 \leq k_m \leq M_m$, $M_m$ represents the number of the $m^{th}$ layer of I/Q domain precoding branches, $$M_1 \times M_2 \times \cdots \times M_L = M \text{ and } k_L + \sum_{m=1}^{L-1}\left[(k_m-1)\prod_{l=m+1}^{L} M_l\right] = i$$

are met, and $\Delta f_m$ represents a frequency increment of the $m^{th}$ layer;

S2-2: performing high-dimensional mapping on the original signal $s_0(t)$ to obtain a high-dimensional original signal s(t):

$$s(t) = \begin{bmatrix} s_1(t) \\ s_2(t) \\ \vdots \\ s_M(t) \end{bmatrix}, \sum_{i=1}^{M} s_i(t) = s_0(t)$$

where the number of dimensions of the high-dimensional original signal is M, and $s_i(t)$ represents the $i^{th}$ dimension of the high-dimensional original signal; and S2-3: processing the high-dimensional original signal according to the high-dimensional precoding signal to obtain an I/Q domain pre-coded signal x(t):

$$x(t) = \begin{bmatrix} x_1(t) \\ x_2(t) \\ \vdots \\ x_M(t) \end{bmatrix} = \begin{bmatrix} s_1(t)\alpha_1(t+\Delta\tau) \\ s_2(t)\alpha_2(t+\Delta\tau) \\ \vdots \\ s_M(t)\alpha_M(t+\Delta\tau) \end{bmatrix}$$

where $x_i(t)$ represents the $i^{th}$ dimension of the I/Q domain pre-coded signal.

In S3, a specific process of the I/Q domain matching operation is as follows:

$$\hat{s}_0(t) = [\alpha_1^*(t) \ \alpha_2^*(t) \ \ldots \ \alpha_M^*(t)]\begin{bmatrix} \hat{x}_1(t) \\ \hat{x}_2(t) \\ \vdots \\ \hat{x}_M(t) \end{bmatrix} = \sum_{i=1}^{M} \alpha_i^*(t)\hat{x}_i(t)$$

where $\hat{x}(t)=[\hat{x}_1(t) \ \hat{x}_2(t) \ \ldots \ \hat{x}_M(t)]^T$ represents an I/Q domain initial received signal, a superscript T represents transposition, $$\alpha_i^*(t) = \prod_{m=1}^{L} \exp[j2\pi(k_m-1)\Delta f_m t],$$

* represents conjugation, and $\hat{s}_0(t)$ represents an estimate for the original signal.

In S2-2, the high-dimensional mapping method comprises:

a first method:

$$s_i(t) = \frac{1}{M} s_0(t);$$

and
a second method:

$$s_i(t) = \frac{1}{M} s_0(t) + n_i(t),$$

where $n_i(t)$ is an $i^{th}$ I/Q domain random offset signal and meets that $[n_1(t) \ n_2(t) \ldots n_M(t)]^T$ is located in a solution space of an equation $$\sum_{i=1}^{M} n_i(t) = 0.$$

Further, the transmitter adopts a narrow-beam antenna to be pointed at the receiver.

A spatial position-dependent dual domain modulation method is based on a transmitter, a receiver and a plurality of channel resources, where the transmitter is configured to process and transmit an original signal, the receiver is configured to recover the original signal, the channel resources are used for the transmitter and the receiver, and the channel resources include time-domain, frequency-domain, space-domain and code-domain resources.

The method of the present invention includes the following steps:

S1: performing time synchronization on the transmitter and the receiver to obtain a synchronization time;

S2: performing, by the transmitter, an I/Q domain precoding operation on the original signal to obtain an I/Q domain pre-coded signal, performing, by the transmitter, a phase domain precoding operation on the I/Q domain pre-coded signal to obtain a phase domain pre-coded signal, and transmitting, by the transmitter, the phase domain pre-coded signal to the receiver by using the plurality of channel resources; and S3: receiving, by the receiver, the phase domain pre-coded signal to obtain a phase domain initial received signal, performing a phase domain matching operation on the phase domain initial received signal to obtain a phase domain matched signal, and performing, by the receiver, an I/Q domain matching operation on the phase domain matched signal to obtain an estimate for the original signal.

In S2, the I/Q domain precoding operation includes the following steps:

S2-1: generating, by the transmitter, an I/Q domain high-dimensional precoding signal $\alpha(t+\Delta\tau)$ according to the synchronization time t and a transmission delay $\Delta\tau$ to the receiver:

$$\alpha(t+\Delta\tau) = \begin{bmatrix} \alpha_1(t+\Delta\tau) \\ \alpha_2(t+\Delta\tau) \\ \vdots \\ \alpha_M(t+\Delta\tau) \end{bmatrix}$$

where $\alpha_i(t+\Delta\tau)$ represents the $i^{th}$ dimension of the high-dimensional precoding signal, i=1, 2, . . . , M, M represents the number of dimensions of the high-dimensional precoding signal, and M does not exceed the number of the channel resources, $$\alpha_i(t+\Delta\tau) = \prod_{m=1}^{L} \exp[-j2\pi(k_m - 1)\Delta f_m(t+\Delta\tau)]$$

where $j=\sqrt{-1}$, $1 \leq m \leq L$, L represents the number of I/Q domain precoding layers, $L \geq 1$, $k_m$ represents an index of the $m^{th}$ layer of I/Q domain precoding branches, $1 \leq k_m \leq M_m$, $M_m$ represents the number of the $m^{th}$ layer of I/Q domain precoding branches, $M_1 \times M_2 \times \ldots \times M_L = M$ and $$k_L + \sum_{m=1}^{L-1}\left[(k_m - 1)\prod_{l=m+1}^{L} M_l\right] = i$$

are met, and $\Delta f_m$ represents a frequency increment of the $m^{th}$ layer;

S2-2: performing high-dimensional mapping on the original signal $s_0(t)$ to obtain a high-dimensional original signal $s(t)$:

$$s(t) = \begin{bmatrix} s_1(t) \\ s_2(t) \\ \vdots \\ s_M(t) \end{bmatrix}, \sum_{i=1}^{M} s_i(t) = s_0(t)$$

where the number of dimensions of the high-dimensional original signal is M, and $s_i(t)$ represents the $i^{th}$ dimension of the high-dimensional original signal; and S2-3: processing the high-dimensional original signal according to the I/Q domain high-dimensional precoding signal to obtain an I/Q domain pre-coded signal $x(t)$:

$$x(t) = \begin{bmatrix} x_1(t) \\ x_2(t) \\ \vdots \\ x_M(t) \end{bmatrix} = \begin{bmatrix} s_1(t)\alpha_1(t+\Delta\tau) \\ s_2(t)\alpha_2(t+\Delta\tau) \\ \vdots \\ s_M(t)\alpha_M(t+\Delta\tau) \end{bmatrix}$$

where $x_i(t)$ represents the $i^{th}$ dimension of the I/Q domain pre-coded signal.

The phase domain precoding operation includes the following steps:

S2-4: generating, by the transmitter, a phase domain high-dimensional precoding signal $\beta(t+\Delta\tau)$ according to the synchronization time t and a transmission delay $\Delta\tau$ to the receiver:

$$\beta(t+\Delta\tau) = \begin{bmatrix} \beta_1(t+\Delta\tau) \\ \beta_2(t+\Delta\tau) \\ \vdots \\ \beta_N(t+\Delta\tau) \end{bmatrix}$$

where $\beta_j(t+\Delta\tau)$ represents the $j^{th}$ dimension of the high-dimensional precoding signal, j=1, 2, . . . , N, N represents the number of dimensions of the high-dimensional precoding signal, and M×N does not exceed the number of the channel resources, $$\beta_j(t+\Delta\tau) = \delta + \prod_{p=1}^{T} A_{p,n_p} \cos[2\pi(n_p - 1)\Delta f_p(t+\Delta\tau)]$$

where T represents the number of phase domain precoding layers, $T \geq 1$, $1 \leq p \leq T$, $n_p$ represents an index of the $p^{th}$ layer of phase domain precoding branches, $1 \leq n_p \leq N_p$, $N_p$ represents the number of the $p^{th}$ layer of phase domain precoding branches, $N_1 \times N_2 \times \ldots \times N_T = N$ and $$n_T + \sum_{p=1}^{T-1}\left[(n_p - 1)\prod_{l=p+1}^{T} N_l\right] = j$$

are met, $\Delta f_p$ represents a frequency increment of the $p^{th}$ layer, $A_{p,n_p}$ represents an amplitude of a precoding signal on the $n_p^{th}$ branch in the $p^{th}$ layer of phase domain precoding branch, and δ is a normal number agreed by the transmitter and the receiver in advance and has a value meeting $$\delta + \prod_{p=1}^{T} A_{p,n_p} \cos[2\pi(n_p - 1)\Delta f_p(t + \Delta\tau)] > 0;$$

S2-5: performing phase domain high-dimensional mapping on a phase $\angle x_i(t)$ of the $i^{th}$ dimension of the I/Q domain pre-coded signal to obtain an $i^{th}$ high-dimensional phase signal $\angle x_i(t)$:

$$\angle x_i(t) = \begin{bmatrix} \angle x_{i,1}(t) \\ \angle x_{i,2}(t) \\ \vdots \\ \angle x_{i,N}(t) \end{bmatrix}, \sum_{k=1}^{N} \angle x_{i,k}(t) = \angle x_i(t) \bmod(2\pi)$$

where the number of dimensions of the high-dimensional phase signal is N, $\angle x_{i,k}(t)$ represents the $k^{th}$ dimension of the $i^{th}$ high-dimensional phase signal, k=1, 2, ..., N, and mod is a remainder function; and S2-6: processing the $i^{th}$ high-dimensional phase signal according to the phase domain high-dimensional precoding signal to obtain an $i^{th}$ phase domain pre-coded signal $\xi_i(t)$:

$$\xi_i(t) = \begin{bmatrix} \xi_{i,1}(t) \\ \xi_{i,2}(t) \\ \vdots \\ \xi_{i,N}(t) \end{bmatrix} = \begin{bmatrix} \exp[j\angle x_{i,1}(t)\beta_1(t + \Delta\tau)] \\ \exp[j\angle x_{i,2}(t)\beta_2(t + \Delta\tau)] \\ \vdots \\ \exp[j\angle x_{i,N}(t)\beta_N(t + \Delta\tau)] \end{bmatrix}$$

where $\xi_{i,k}(t)$ represents the $k^{th}$ dimension of the $i^{th}$ phase domain pre-coded signal, and combining, by the transmitter, the $i^{th}$ phase domain pre-coded signal into a phase domain pre-coded signal:

$$\xi(t) = \begin{bmatrix} \xi_1(t) \\ \xi_2(t) \\ \vdots \\ \xi_M(t) \end{bmatrix}.$$

In S3, a specific process of the phase domain matching operation is as follows:

$$\hat{x}_i(t) = \exp\left\{j[\gamma_1(t) \; \gamma_2(t) \; \ldots \; \gamma_N(t)] \begin{bmatrix} \angle\hat{\xi}_{i,1}(t) \\ \angle\hat{\xi}_{i,2}(t) \\ \vdots \\ \angle\hat{\xi}_{i,N}(t) \end{bmatrix}\right\}$$

$$= \exp\left[j\sum_{k=1}^{N} \gamma_k(t)\angle\hat{\xi}_{i,k}(t)\right]$$

$$\hat{\xi}(t) = \begin{bmatrix} \hat{\xi}_1(t) \\ \hat{\xi}_2(t) \\ \vdots \\ \hat{\xi}_M(t) \end{bmatrix}, \hat{\xi}_i(t) = \begin{bmatrix} \hat{\xi}_{i,1}(t) \\ \hat{\xi}_{i,2}(t) \\ \vdots \\ \hat{\xi}_{i,N}(t) \end{bmatrix}$$

where $\hat{\xi}(t)$ represents a phase domain initial received signal, a superscript T represents transposition, $\gamma_j(t)$ represents a matched signal corresponding to $\beta_j(t+\Delta\tau)$ and has a value meeting $$\gamma_i(t)\left\{\delta + \prod_{p=1}^{T} A_{p,n_p} \cos[2\pi(n_p - 1)\Delta f_p t]\right\} = 1 \bmod(2\pi),$$

$\hat{x}_i(t)$ represents the $i^{th}$ dimension of the phase domain matched signal, and the phase domain matched signal is $\hat{x}(t)=[\hat{x}_1(t) \; \hat{x}_2(t) \ldots \hat{x}_M(t)]^T$.

A specific process of the I/Q domain matching operation is as follows:

$$\hat{s}_0(t) = [\alpha_1^*(t) \; \alpha_2^*(t) \; \ldots \; \alpha_M^*(t)] \begin{bmatrix} \hat{x}_1(t) \\ \hat{x}_2(t) \\ \vdots \\ \hat{x}_M(t) \end{bmatrix} = \sum_{i=1}^{M} \alpha_i^*(t)\hat{x}_i(t)$$

where $$\alpha_i^*(t) = \prod_{m=1}^{L} \exp[j2\pi(k_m - 1)\Delta f_m t],$$

* represents conjugation, and $\hat{s}_0(t)$ represents an estimate for the original signal.

In S2-2, the high-dimensional mapping method comprises:

a first method:

$$s_i(t) = \frac{1}{M} s_0(t);$$

and a second method:

$$s_i(t) = \frac{1}{M} s_0(t) + n_i(t),$$

where $n_i(t)$ is an $i^{th}$ I/Q domain random offset signal and meets that $[n_1(t) \; n_2(t) \ldots n_M(t)]^T$ is located in a solution space of an equation $$\sum_{i=1}^{M} n_i(t) = 0.$$

In S2-5, the phase domain high-dimensional mapping method comprises:
a first method:

$$\angle x_{i,k}(t) = \frac{1}{N}\angle x_i(t);$$

and
a second method:

$$\angle x_{i,k}(t) = \frac{1}{N}\angle x_i(t) + \theta_k(t),$$

where $\theta_k(t)$ is a $k^{th}$ phase domain random offset signal and meets that $[\theta_1(t)\ \theta_2(t)\ \ldots\ \theta_N(t)]^T$ is located in a solution space of an equation $$\sum_{k=1}^{N}\theta_k(t) = 0.$$

Further, the transmitter adopts a narrow-beam antenna to be pointed at the receiver.

A position-based multiple access communication method is based on a transmitter, a receiver and a plurality of channel resources, where the transmitter is configured to process and transmit an original signal, the receiver is configured to recover the original signal, the channel resources are used for the transmitter and the receiver, and the channel resources include time-domain, frequency-domain, space-domain and code-domain resources.

The method of the present invention includes the following steps:
S1: performing time synchronization on the transmitter and several users to obtain a synchronization time t;
S2: mapping, by the transmitter, an original signal of the $u^{th}$ user to a $u^{th}$ high-dimensional original signal, where the $u^{th}$ high-dimensional original signal is as follows:

$$s(u, t) = \begin{bmatrix} s_1(u, t) \\ s_2(u, t) \\ \vdots \\ s_M(u, t) \end{bmatrix},$$

$$s_1(u, t) = s_2(u, t) = \ldots = s_M(u, t) = \frac{s_0(u, t)}{\sqrt{M}}$$

where $s_0(u, t)$ is the original signal of the $u^{th}$ user, $s_i(u, t)$ is the $i^{th}$ dimension of the $u^{th}$ high-dimensional original signal, $i=1, 2, \ldots, M$, and M is the dimension of the $u^{th}$ high-dimensional original signal and has a value equal to the number of the channel resources;
S3: performing, by the transmitter, I/Q domain precoding on the $u^{th}$ high-dimensional original signal to generate a $u^{th}$ high-dimensional transmission signal, where the I/Q domain precoding process is as follows:

$$x(u, t) = \begin{bmatrix} x_1(u, t) \\ x_2(u, t) \\ \vdots \\ x_M(u, t) \end{bmatrix} = \begin{bmatrix} s_1(u, t)\alpha_1(u, t + \Delta\tau_u) \\ s_2(u, t)\alpha_2(u, t + \Delta\tau_u) \\ \vdots \\ s_M(u, t)\alpha_M(u, t + \Delta\tau_u) \end{bmatrix}$$

where $x(u, t)$ represents the $u^{th}$ high-dimensional transmission signal, $x_i(u, t)$ represents the $i^{th}$ dimension of the $u^{th}$ high-dimensional transmission signal, $\alpha_i(u, t+\Delta\tau)$ represents the $i^{th}$ dimension of the $u^{th}$ precoding signal, $i=1, 2, \ldots, M$, and $\Delta\tau_u$ represents a transmission delay from the transmitter to the $u^{th}$ user;
S4: summing, by the transmitter, all the $u^{th}$ high-dimensional transmission signals to obtain a high-dimensional total transmission signal:

$$\tilde{x}(t) = \sum_{u=1}^{U} x(u, t)$$

where U represents the number of users; broadcasting, by the transmitter, the high-dimensional total transmission signal to a plurality of users by using the channel resources, where each of the channel resources transmits one dimension of the high-dimensional total transmission signal; and
S5: receiving, by the $u^{th}$ user, the high-dimensional total transmission signal to obtain a high-dimensional total receiving signal, and performing an I/Q domain matching operation on the high-dimensional total receiving signal to obtain an estimate $\hat{s}_0(u, t)$ for the $u^{th}$ original signal.

In S3, the $u^{th}$ precoding signal is as follows:

$$\alpha(u, t + \Delta\tau) = \begin{bmatrix} \alpha_1(u, t + \Delta\tau_u) \\ \alpha_2(u, t + \Delta\tau_u) \\ \vdots \\ \alpha_M(u, t + \Delta\tau_u) \end{bmatrix},$$

and
the $i^{th}$ dimension of the $u^{th}$ precoding signal is as follows:

$$\alpha_i(u, t + \Delta\tau_u) = \sum_{m=1}^{L} \exp(-j2\pi(k_m - 1)\Delta f_m(t + \Delta\tau_u))$$

In S5, an I/Q domain matching process is as follows:

$$\hat{\tilde{x}}(t) = \begin{bmatrix} \tilde{x}_1(t) \\ \tilde{x}_2(t) \\ \vdots \\ \tilde{x}_M(t) \end{bmatrix}$$

$$\hat{s}_0(u, t) = \sum_{i=1}^{M} \alpha_i^*(u, t)\hat{\tilde{x}}_i(t)$$

where $\alpha_i^*(u, t)$ represents the $i^{th}$ dimension of the $u^{th}$ matched signal, $\hat{\tilde{x}}(t)$ represents the high-dimensional total receiving signal, and $\hat{\tilde{x}}_i(t)$ represents the $i^{th}$ dimension of the high-dimensional total receiving signal.
In S5, the $u^{th}$ matched signal is as follows:

$$\alpha^*(u, t) = \begin{bmatrix} \alpha_1^*(u, t) \\ \alpha_2^*(u, t) \\ \vdots \\ \alpha_M^*(u, t) \end{bmatrix},$$

and the $i^{th}$ dimension of the $u^{th}$ matched signal is as follows:

$$\alpha_i^*(u, t) = \sum_{m=1}^{L} \exp(j2\pi(k_m - 1)\Delta f_m t).$$

The beneficial effects of the present invention are:
according to the methods of the present invention, the dependence of physical layer secure communication on channel state information is overcome, and the proper transmission to a legitimate receiver at an expected position can be achieved. An eavesdropper at other positions cannot receive any signal, or can only receive error signals. The security level of a wireless communication system is improved from the spatial dimension.

According to the multiple access communication method of the present invention, a plurality of users can be distinguished according to accurate spatial positions. Even if the plurality of users are located in a same sector in an angular domain, as long as the spatial positions of these users are different, the method provided by the present invention can be used to perform multiple access communications, thereby further improving the spatial multiplexing rate of the system and increasing the system capacity.

DETAILED DESCRIPTION OF THE EMBODIMENTS

Figure 1A:
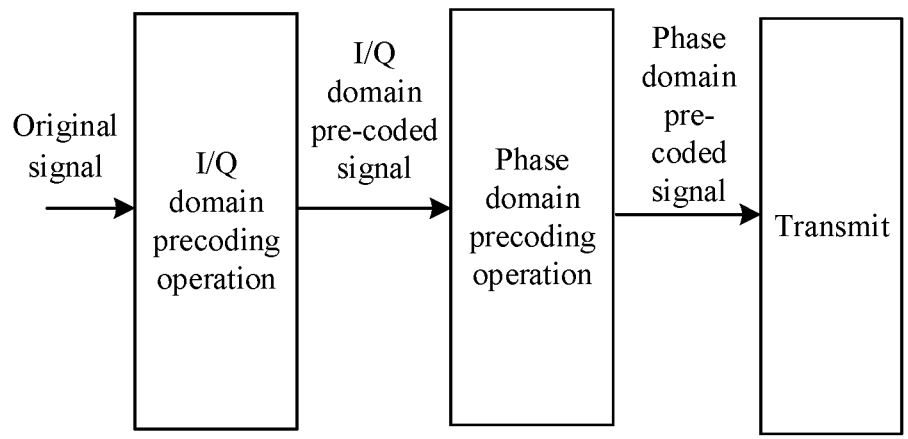
FIGS. 1A and 1B are schematic flowcharts of a method according to Embodiment 2 of the present invention.

The present invention is further described with reference to the accompanying drawings and embodiments.

Embodiment 1

This embodiment provides a spatial position-dependent I/Q domain modulation method, which is based on a transmitter, a receiver and a plurality of channel resources, where the transmitter is configured to process and transmit an original signal, the receiver is configured to recover the original signal, the channel resources are used for the transmitter and the receiver, and the channel resources include time-domain, frequency-domain, space-domain and code-domain resources.

The method in this embodiment includes the following steps:

S1: time synchronization is performed on the transmitter and the receiver to obtain a synchronization time;

S2: performing, by the transmitter, an I/Q domain precoding operation on the original signal to obtain an I/Q domain pre-coded signal, and transmitting, by the transmitter, the I/Q domain pre-coded signal to the receiver by using the plurality of channel resources; and S3: the receiver receives the I/Q domain pre-coded signal to obtain an I/Q domain initial received signal, and an I/Q domain matching operation is performed on the I/Q domain initial received signal to obtain an estimate for the original signal.

In S2, the I/Q domain precoding operation includes the following steps:

S2-1: the transmitter generates an I/Q domain high-dimensional precoding signal $\alpha(t+\Delta\tau)$ according to the synchronization time t and a transmission delay $\Delta\tau$ to the receiver:

$$\alpha(t+\Delta\tau) = \begin{bmatrix} \alpha_1(t+\Delta\tau) \\ \alpha_2(t+\Delta\tau) \\ \vdots \\ \alpha_M(t+\Delta\tau) \end{bmatrix}$$

where $\alpha_i(t+\Delta\tau)$ represents the $i^{th}$ dimension of the I/Q domain high-dimensional precoding signal, j=1, 2, ..., M, M represents the number of dimensions of the I/Q domain high-dimensional precoding signal, and M does not exceed the number of the channel resources, $$\alpha_i(t+\Delta\tau) = \prod_{m=1}^{L} \exp[-j2\pi(k_m - 1)\Delta f_m(t+\Delta\tau)]$$

where $j=\sqrt{-1}$, $1 \leq m \leq L$, L represents the number of I/Q domain precoding layers, $L \geq 1$, $k_m$ represents an index of the $m^{th}$ layer of I/Q domain precoding branches, $1 \leq k_m \leq M_m$, $M_m$ represents the number of the $m^{th}$ layer of I/Q domain precoding branches, $M_1 \times M_2 \times \ldots \times M_L = M$ and $$k_L + \sum_{m=1}^{L-1}\left[(k_m - 1)\prod_{l=m+1}^{L} M_l\right] = i$$

are met, and $\Delta f_m$ represents a frequency increment of the $m^{th}$ layer determined in advance;

S2-2: high-dimensional mapping is performed on the original signal $s_0(t)$ to obtain a high-dimensional original signal s(t):

$$s(t) = \begin{bmatrix} s_1(t) \\ s_2(t) \\ \vdots \\ s_M(t) \end{bmatrix}, \sum_{i=1}^{M} s_i(t) = s_0(t)$$

where the number of dimensions of the high-dimensional original signal is M, and $s_i(t)$ represents the $i^{th}$ dimension of the high-dimensional original signal; and S2-3: the high-dimensional original signal is processed according to the high-dimensional precoding signal to obtain an I/Q domain pre-coded signal x(t):

$$x(t) = \begin{bmatrix} x_1(t) \\ x_2(t) \\ \vdots \\ x_M(t) \end{bmatrix} = |s(t)| = \begin{bmatrix} s_1(t)\alpha_1(t+\Delta\tau) \\ s_2(t)\alpha_2(t+\Delta\tau) \\ \vdots \\ s_M(t)\alpha_M(t+\Delta\tau) \end{bmatrix}$$

where $x_i(t)$ represents the dimension of the I/Q domain pre-coded signal.

In S3, to specific process of the I/Q domain matching operation is as follows:

$$\hat{s}_0(t) = [\alpha_1^*(t) \; \alpha_2^*(t) \; \ldots \; \alpha_M^*(t)] \begin{bmatrix} \hat{x}_1(t) \\ \hat{x}_2(t) \\ \vdots \\ \hat{x}_M(t) \end{bmatrix} = \sum_{i=1}^{M} \alpha_i^*(t)\hat{x}_i(t)$$

where $\hat{x}(t)=[\hat{x}_1(t)\ \hat{x}_2(t)\ \ldots\ \hat{x}_M(t)]^T$ represents an I/Q domain initial received signal, a superscript T represents transposition, $$\alpha_i^*(t) = \prod_{m=1}^{L} \exp[j2\pi(k_m - 1)\Delta f_m t],$$

* represents conjugation, and $\hat{s}_0(t)$ represents an estimate for the original signal.

In S2-2, the high-dimensional mapping method comprises:
a first method:

$$s_i(t) = \frac{1}{M} s_0(t);$$

and
a second method:

$$s_i(t) = \frac{1}{M} s_0(t) + n_i(t),$$

where $n_i(t)$ is an $i^{th}$ I/Q domain random offset signal and meets that $[n_1(t)\ n_2(t)\ldots n_M(t)]^T$ is located in a solution space of an equation $$\sum_{i=1}^{M} n_i(t) = 0.$$

Further, the transmitter adopts a narrow-beam antenna to be pointed at the receiver.

Embodiment 2

This embodiment provides a spatial position-dependent dual domain modulation method, which is based on a transmitter, a receiver and a plurality of channel resources, where the transmitter is configured to process and transmit an original signal, the receiver is configured to recover the original signal, the channel resources are used for the transmitter and the receiver, and the channel resources include time-domain, frequency-domain, space-domain and code-domain resources.

Figure 1B:
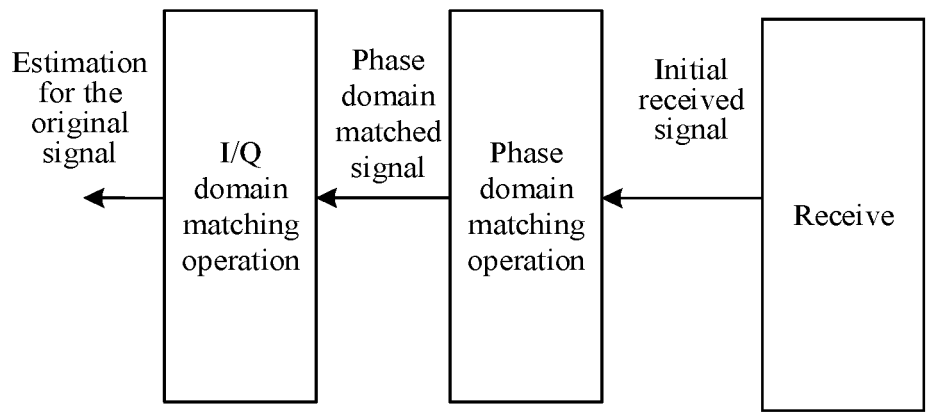

The schematic flowcharts of the method in this embodiment are shown in FIGS. 1A and 1B, including the following steps:

S1: time synchronization is performed on the transmitter and the receiver to obtain a synchronization time;

S2: the transmitter performs an I/Q domain precoding operation on the original signal to obtain an I/Q domain pre-coded signal, the transmitter performs a phase domain precoding operation on the I/Q domain pre-coded signal to obtain a phase domain pre-coded signal, and the transmitter transmits the phase domain pre-coded signal to the receiver by using the plurality of channel resources; and S3: the receiver receives the phase domain pre-coded signal to obtain a phase domain initial received signal, a phase domain matching operation is performed on the phase domain initial received signal to obtain a phase domain matched signal, and the receiver performs an I/Q domain matching operation on the phase domain matched signal to obtain an estimate for the original signal.

In S2, the I/Q domain precoding operation includes the following steps:

S2-1: the transmitter generates an I/Q domain high-dimensional precoding signal $\alpha(t+\Delta\tau)$ according to the synchronization time t and a transmission delay $\Delta\tau$ to the receiver:

$$\alpha(t+\Delta\tau) = \begin{bmatrix} \alpha_1(t+\Delta\tau) \\ \alpha_2(t+\Delta\tau) \\ \vdots \\ \alpha_M(t+\Delta\tau) \end{bmatrix}$$

where $\alpha_i(t+\Delta\tau)$ represents the $i^{th}$ dimension of the high-dimensional precoding signal, i=1, 2, . . . , M, M represents the number of dimensions of the high-dimensional precoding signal, and M does not exceed the number of the channel resources, $$\alpha_i(t+\Delta\tau) = \prod_{m=1}^{L} \exp[-j2\pi(k_m-1)\Delta f_m(t+\Delta\tau)].$$

where $j=\sqrt{-1}$, $1\le m\le L$, L represents the number of I/Q domain precoding layers, $L\ge 1$, $k_m$ represents an index of the $m^{th}$ layer of I/Q domain precoding branches, $1\le k_m\le M_m$, $M_m$ represents the number of the $m^{th}$ layer of I/Q domain precoding branches, $M_1\times M_2\times\ldots\times M_L = M$ and $$k_L + \sum_{m=1}^{L-1}\left[(k_m - 1) \prod_{i=m+1}^{L} M_i\right] = i$$

are met, and $\Delta f_m$: represents a frequency increment of the $m^{th}$ layer determined in advance;

S2-2: high-dimensional mapping is performed on the original signal $s_0(t)$ to obtain a high-dimensional original signal s(t):

$$s(t) = \begin{bmatrix} s_1(t) \\ s_2(t) \\ \vdots \\ s_M(t) \end{bmatrix}, \sum_{i=1}^{M} s_i(t) = s_0(t)$$

where the number of dimensions of the high-dimensional original signal is M, and $s_i(t)$ represents the $i^{th}$ dimension of the high-dimensional original signal; and S2-3: the high-dimensional original signal is processed according to the I/Q domain high-dimensional precoding signal to obtain an I/Q domain pre-coded signal x(t):

$$X(t) = \begin{bmatrix} x_1(t) \\ x_2(t) \\ \vdots \\ x_M(t) \end{bmatrix} = \begin{bmatrix} s_1(t)\alpha_1(t+\Delta\tau) \\ s_2(t)\alpha_2(t+\Delta\tau) \\ \vdots \\ s_M(t)\alpha_M(t+\Delta\tau) \end{bmatrix}$$

where $x_i(t)$ represents the $i^{th}$ dimension of the I/Q domain pre-coded signal.

The phase domain precoding operation includes the following steps:

S2-4: the transmitter generates a phase domain high-dimensional precoding signal $\beta(t+\Delta\tau)$ according to the synchronization time t and a transmission delay $\Delta\tau$ to the receiver:

$$\beta(t+\Delta\tau) = \begin{bmatrix} \beta_1(t+\Delta\tau) \\ \beta_2(t+\Delta\tau) \\ \vdots \\ \beta_N(t+\Delta\tau) \end{bmatrix}$$

where $\beta_j(t+\Delta\tau)$ represents the $j^{th}$ dimension of the high-dimensional precoding signal, j=1, 2, ..., N, N represents the number of dimensions of the high-dimensional precoding signal, and M×N does not exceed the number of the channel resources, $$\beta_j(t+\Delta\tau) = \delta + \prod_{p=1}^{T} A_{p,n_p} \cos[2\pi(n_p-1)\Delta f_p(t+\Delta\tau)]$$

where T represents the number of phase domain precoding layers, $T \geq 1$, $1 \leq p \leq T$, $n_p$ represents an index of the $p^{th}$ layer of phase domain precoding branches, $1 \leq n_p \leq N_p$, $N_p$ represents the number of the $p^{th}$ layer of phase domain precoding branches, $N_1 \times N_2 \times \ldots \times N_T = N$ and $$n_T + \sum_{p=1}^{T-1} \left[ (n_p - 1) \prod_{l=p+1}^{T} N_l \right] = j$$

are met, $\Delta f_p$ represents a frequency increment of the $p^{th}$ layer determined in advance, $A_{p,n_p}$ represents an amplitude of a precoding signal on the $n_p^{th}$ branch in the $p^{th}$ layer of phase domain precoding branch and has a value determined in advance, and $\delta$ is a normal number agreed by the transmitter and the receiver in advance and has a value meeting $$\delta + \prod_{p=1}^{T} A_{p,n_p} \cos[2\pi(n_p-1)\Delta f_p(t+\Delta\tau)] > 0;$$

S2-5: phase domain high-dimensional mapping is performed on a phase $\angle x_i(t)$ of the $i^{th}$ dimension of the I/Q domain pre-coded signal to obtain an $i^{th}$ high-dimensional phase signal $\angle x_i(t)$:

$$\angle x_i(t) = \begin{bmatrix} \angle x_{i,1}(t) \\ \angle x_{i,2}(t) \\ \vdots \\ \angle x_{i,N}(t) \end{bmatrix}, \sum_{i=1}^{N} \angle x_{i,k}(t) = \angle x_i(t) \bmod (2\pi)$$

where the number of dimensions of the high-dimensional phase signal is N, $\angle x_{i,k}(t)$ represents the $k^{th}$ dimension of the $i^{th}$ high-dimensional phase signal, k=1, 2, ..., N, and mod is a remainder function; and S2-6: the $i^{th}$ high-dimensional phase signal is processed according to the phase domain high-dimensional precoding signal to obtain an $i^{th}$ phase domain pre-coded signal $\xi_i(t)$:

$$\xi_i(t) = \begin{bmatrix} \xi_{i,1}(t) \\ \xi_{i,2}(t) \\ \vdots \\ \xi_{i,N}(t) \end{bmatrix} = \begin{bmatrix} \exp[j\angle x_{i,1}(t)\beta_1(t+\Delta\tau)] \\ \exp[j\angle x_{i,2}(t)\beta_2(t+\Delta\tau)] \\ \vdots \\ \exp[j\angle x_{i,N}(t)\beta_N(t+\Delta\tau)] \end{bmatrix}$$

where $\xi_{i,k}(t)$ represents the $k^{th}$ dimension of the $i^{th}$ phase domain pre-coded signal, and the transmitter combines the $i^{th}$ phase domain pre-coded signal into a phase domain pre-coded signal:

$$\xi(t) = \begin{bmatrix} \xi_1(t) \\ \xi_2(t) \\ \vdots \\ \xi_M(t) \end{bmatrix}$$

In S3, a specific process of the phase domain matching operation is as follows:

$$\hat{x}_i(t) = \exp\left\{ j[\gamma_1(t) \ \gamma_2(t) \ \ldots \ \gamma_N(t)] \begin{bmatrix} \angle\hat{\xi}_{i,1}(t) \\ \angle\hat{\xi}_{i,2}(t) \\ \vdots \\ \angle\hat{\xi}_{i,N}(t) \end{bmatrix} \right\} = \exp\left[ j \sum_{i=1}^{N} \gamma_k(t) \angle\hat{\xi}_{i,k}(t) \right]$$

$$\hat{\xi}(t) = \begin{bmatrix} \hat{\xi}_1(t) \\ \hat{\xi}_2(t) \\ \vdots \\ \hat{\xi}_M(t) \end{bmatrix}, \hat{\xi}_i(t) = \begin{bmatrix} \hat{\xi}_{i,1}(t) \\ \hat{\xi}_{i,2}(t) \\ \vdots \\ \hat{\xi}_{i,N}(t) \end{bmatrix}$$

where $\hat{\xi}(t)$ represents a phase domain initial received signal, a superscript T represents transposition, $\gamma_j(t)$ represents a matched signal corresponding to $\beta_j(t+\Delta\tau)$ and has a value meeting $$\gamma_i(t)\left\{ \delta + \prod_{p=1}^{T} A_{p,n_p} \cos[2\pi(n_p-1)\Delta f_p t] \right\} = 1 \bmod (2\pi), \hat{x}_i(t)$$

represents the $i^{th}$ dimension of the phase domain matched signal, and the phase domain matched signal is $$\hat{x}(t) = [\hat{x}_1(t) \ \hat{x}_2(t) \ \ldots \ \hat{x}_M(t)]^T.$$

A specific process of the I/Q domain matching operation is as follows:

$$\hat{s}_0(t) = [\alpha_1^*(t) \ \alpha_2^*(t) \ \ldots \ \alpha_M^*(t)] \begin{bmatrix} \hat{x}_1(t) \\ \hat{x}_2(t) \\ \vdots \\ \hat{x}_M(t) \end{bmatrix} = \sum_{i=1}^{M} \alpha_i^*(t)\hat{x}_i(t)$$

where $$\alpha_i^*(t) = \sum_{m=1}^{L} \exp[j2\pi(k_m - 1)\Delta f_m t],$$

* represents conjugation, and $\hat{s}_0(t)$ represents an estimate for the original signal.

In S2-2, the high-dimensional mapping method comprises:

a first method:

$$s_i(t) = \frac{1}{M} s_0(t);$$

and
a second method:

$$s_i(t) = \frac{1}{M} s_0(t) + n_i(t),$$

where $n_i(t)$ is an $i^{th}$ I/Q domain random offset signal and meets that $[n_1(t)\ n_2(t)\ \ldots\ n_M(t)]^T$ is located in a solution space of an equation $$\sum_{i=1}^{M} n_i(t) = 0.$$

In S2-5, the phase domain high-dimensional mapping method comprises:
a first method:

$$\angle x_{i,k}(t) = \frac{1}{N} \angle x_i(t);$$

and
a second method:

$$\angle x_{i,k}(t) = \frac{1}{N} \angle x_i(t) + \theta_k(t),$$

where $\theta_k(t)$ is a $k^{th}$ phase domain random offset signal and meets that $[\theta_1(t)\ \theta_2(t)\ \ldots\ \theta_N(t)]^T$ is located in a solution space of an equation $$\sum_{k=1}^{N} \theta_k(t) = 0.$$

Further, the transmitter adopts a narrow-beam antenna to be pointed at the receiver.

Embodiment 3

This embodiment provides a position-based multiple access communication method, which is based on a transmitter, a receiver and a plurality of channel resources, where the transmitter is configured to process and transmit an original signal, the receiver is configured to recover the original signal, the channel resources are used for the transmitter and the receiver, and the channel resources include time-domain, frequency-domain, space-domain and code-domain resources.

The method in this embodiment includes the following steps:

S1: time synchronization is performed on the transmitter and several users to obtain a synchronization time t;

S2: mapping, by the transmitter, an original signal of a $u^{th}$ user to a $u^{th}$ high-dimensional original signal, where the $u^{th}$ high-dimensional original signal is as follows:

$$s(u, t) = \begin{bmatrix} s_1(u, t) \\ s_2(u, t) \\ \vdots \\ s_M(u, t) \end{bmatrix},$$

$$s_1(u, t) = s_2(u, t) = \ldots = s_M(u, t) = \frac{s_0(u, t)}{\sqrt{M}}$$

where $s_0(u, t)$ is the original signal of the $u^{th}$ user, $s_i(u, t)$ is the $i^{th}$ dimension of the $u^{th}$ high-dimensional original signal, i=1, 2, ..., M, and M is the dimension of the $u^{th}$ high-dimensional original signal and has a value equal to the number of the channel resources;

S3: the transmitter performs I/Q domain precoding on the $u^{th}$ high-dimensional original signal to generate a $u^{th}$ high-dimensional transmission signal, where the I/Q domain precoding process is as follows:

$$x(u, t) = \begin{bmatrix} x_1(u, t) \\ x_2(u, t) \\ \vdots \\ x_M(u, t) \end{bmatrix} = \begin{bmatrix} s_1(u, t)\alpha_1(u, t + \Delta\tau_u) \\ s_2(u, t)\alpha_2(u, t + \Delta\tau_u) \\ \vdots \\ s_M(u, t)\alpha_M(u, t + \Delta\tau_u) \end{bmatrix}$$

where $x(u, t)$ represents the $u^{th}$ high-dimensional transmission signal, $x_i(u, t)$ represents the $i^{th}$ dimension of the $u^{th}$ high-dimensional transmission signal, $\alpha_i(u, t+\Delta\tau)$ represents the $i^{th}$ dimension of the $u^{th}$ precoding signal, i=1, 2, ..., M, and $\Delta\tau_u$ represents a transmission delay from the transmitter to the $u^{th}$ user;

S4: the transmitter sums all the $u^{th}$ high-dimensional transmission signals to obtain a high-dimensional total transmission signal:

$$\tilde{x}(t) = \sum_{u=1}^{U} x(u, t)$$

where U represents the number of users; broadcasting, by the transmitter, the high-dimensional total transmission signal to a plurality of users by using the channel resources, where each of the channel resources transmits one dimension of the high-dimensional total transmission signal; and S5: a $u^{th}$ user receives the high-dimensional total transmission signal to obtain a high-dimensional total receiving signal, and an I/Q domain matching operation is performed on the high-dimensional total receiving signal to obtain an estimate $\hat{s}_0(u, t)$ for the $u^{th}$ original signal.

In S3, the $u^{th}$ precoding signal is as follows:

$$\alpha(u, t + \Delta\tau) = \begin{bmatrix} \alpha_1(u, t + \Delta\tau_u) \\ \alpha_2(u, t + \Delta\tau_u) \\ \vdots \\ \alpha_M(u, t + \Delta\tau_u) \end{bmatrix}$$

the $i^{th}$ dimension of the $u^{th}$ precoding signal is as follows:

$$\alpha_1(u, t + \Delta\tau_u) = \prod_{m=1}^{L} \exp(-j2\pi(k_m - 1)\Delta f_m(t + \Delta\tau_u)).$$

In S5, an I/Q domain matching process is as follows:

$$\hat{\hat{x}}(t) = \begin{bmatrix} \hat{x}_1(t) \\ \hat{x}_2(t) \\ \vdots \\ \hat{x}_M(t) \end{bmatrix}$$

$$\hat{s}_0(u, t) = \alpha_i^*(u, t)\hat{\hat{x}}_i(t)$$

where $\alpha_i^*(u, t)$ represents the $i^{th}$ dimension of the $u^{th}$ matched signal, $\hat{\hat{x}}(t)$ represents the high-dimensional total receiving signal, and $\hat{\hat{x}}(t)$ represents the $i^{th}$ dimension of the high-dimensional total receiving signal.

In S5, the $u^{th}$ matched signal is as follows:

$$\alpha^*(u, t) = \begin{bmatrix} \alpha_1^*(u, t) \\ \alpha_2^*(u, t) \\ \vdots \\ \alpha_M^*(u, t) \end{bmatrix},$$

and
the $i^{th}$ dimension of the $u^{th}$ matched signal is as follows:

$$\alpha_i^*(u, t) = \prod_{m=1}^{L} \exp(j2\pi(k_m - 1)\Delta f_m t).$$

What is claimed is:

1. A spatial position-dependent I/Q domain modulation method, based on a transmitter, a receiver and a plurality of channel resources, wherein the transmitter is configured to process and transmit an original signal, the receiver is configured to recover the original signal, the channel resources are used for the transmitter and the receiver, the channel resources comprise time-domain, frequency-domain, space-domain and code-domain resources, and
the method comprises the following steps:
S1: performing a time synchronization on the transmitter and the receiver to obtain a synchronization time;
S2: performing, by the transmitter, an I/Q domain precoding operation on the original signal to obtain an I/Q domain pre-coded signal, and transmitting, by the transmitter, the I/Q domain pre-coded signal to the receiver by using the plurality of channel resources;
wherein in S2, the I/Q domain precoding operation comprises the following steps:
S2-1: generating, by the transmitter, an I/Q domain high-dimensional precoding signal $\alpha(t+\Delta\tau)$ according to the synchronization time t and a transmission delay $\Delta\tau$ to the receiver:

$$\alpha(t + \Delta\tau) = \begin{bmatrix} \alpha_1(t + \Delta\tau) \\ \alpha_2(t + \Delta\tau) \\ \vdots \\ \alpha_M(t + \Delta\tau) \end{bmatrix}$$

wherein represents an $i^{th}$ dimension of the I/Q domain high-dimensional precoding signal, i=1, 2, . . . , M, M represents a number of dimensions of the I/Q domain high-dimensional precoding signal, and M does not exceed a number of the channel resources, $$\alpha_1(t + \Delta\tau) = \prod_{m=1}^{L} \exp[-j2\pi(k_m - 1)\Delta f_m(t + \Delta\tau)]$$

wherein $j > \sqrt{-1}$, $1 \leq m \leq L$, L represents a number of I/Q domain precoding layers, $L \geq 1$, $k_m$ represents an index of an $m^{th}$ layer of I/Q domain precoding branches, $1 \leq k_m \leq M_m$, $M_m$ represents a number of the $m^{th}$ layer of I/Q domain precoding branches, $M_1 \times M_2 \times \ldots \times M_L = M$ and $$k_L + \sum_{m=1}^{L-1}\left[(k_m - 1) \prod_{l=m+1}^{L} M_l\right] = i$$

are met, and $\Delta f_m$ represents a frequency increment of the $m^{th}$ layer;

S2-2: performing high-dimensional mapping on the original signal $s_0(t)$ to obtain a high-dimensional original signal s(t):

$$s(t) = \begin{bmatrix} s_1(t) \\ s_2(t) \\ \vdots \\ s_M(t) \end{bmatrix}, \sum_{i=1}^{M} s_i(t) = s_0(t)$$

wherein a number of dimensions of the high-dimensional original signal is M, and $s_i(t)$ represents an $i^{th}$ dimension of the high-dimensional original signal; and S2-3: processing the high-dimensional original signal according to a high-dimensional precoding signal to obtain an I/Q domain pre-coded signal x(t):

$$x(t) = \begin{bmatrix} x_1(t) \\ x_2(t) \\ \vdots \\ x_M(t) \end{bmatrix} = \begin{bmatrix} s_1(t)\alpha_1(t + \Delta\tau) \\ s_2(t)\alpha_2(t + \Delta\tau) \\ \vdots \\ s_M(t)\alpha_M(t + \Delta\tau) \end{bmatrix}$$

wherein $x_i(t)$ represents an $i^{th}$ dimension of the I/Q domain pre-coded signal; and S3: receiving, by the receiver, the I/Q domain pre-coded signal to obtain an I/Q domain initial received signal, and performing an I/Q domain matching operation on the I/Q domain initial received signal to obtain an estimate for the original signal.

2. The spatial position-dependent I/Q domain modulation method according to claim 1, wherein in S3, a specific process of the I/Q domain matching operation is as follows:

$$\hat{s}_0(t) = [\alpha_1^*(t) \ \alpha_2^*(t) \ \ldots \ \alpha_M^*(t)] \begin{bmatrix} \hat{x}_1(t) \\ \hat{x}_2(t) \\ \vdots \\ \hat{x}_M(t) \end{bmatrix} = \sum_{i=1}^{M} \alpha_i^*(t)\hat{x}_i(t)$$

wherein $\hat{x}(t)=[\hat{x}_1(t) \ \hat{x}_2(t) \ \ldots \ \hat{x}_M(t)]^T$ represents an I/Q domain initial received signal, a superscript T represents transposition, $$\alpha_i^*(t) = \prod_{m=1}^{L} \exp[j2\pi(k_m - 1)\Delta f_m t],$$

* represents conjugation, and $\hat{s}_0(t)$ represents an estimate for the original signal.

3. The spatial position-dependent I/Q domain modulation method according to claim 1, wherein in S2-2, the performing high-dimensional mapping step comprises:
a first method:

$$s_i(t) = \frac{1}{M}s_0(t);$$

and
a second method:

$$s_i(t) = \frac{1}{M}s_0(t) + n_i(t),$$

wherein $n_i(t)$ is an $i^{th}$ I/Q domain random offset signal and meets that $[n_1(t) \ n_2(t) \ \ldots \ n_M(t)]^T$ is located in a solution space of an equation $$\sum_{i=1}^{M} n_i(t) = 0.$$

4. A spatial position-dependent dual domain modulation method, based on a transmitter, a receiver and a plurality of channel resources, wherein the transmitter is configured to process and transmit an original signal, the receiver is configured to recover the original signal, the channel resources are used for the transmitter and the receiver, the channel resources comprise time-domain, frequency-domain, space-domain and code-domain resources, and the method comprises the following steps:
S1: performing a time synchronization on the transmitter and the receiver to obtain a synchronization time;
S2: performing, by the transmitter, an I/Q domain precoding operation on the original signal to obtain an I/Q domain pre-coded signal, performing, by the transmitter, a phase domain precoding operation on the I/Q domain pre-coded signal to obtain a phase domain pre-coded signal, and transmitting, by the transmitter, the phase domain pre-coded signal to the receiver by using the plurality of channel resources; and
S3: receiving, by the receiver, the phase domain pre-coded signal to obtain a phase domain initial received signal, performing a phase domain matching operation on the phase domain initial received signal to obtain a phase domain matched signal, and performing, by the receiver, an I/Q domain matching operation on the phase domain matched signal to obtain an estimate for the original signal,
wherein in the step S2, the I/Q domain precoding operation comprises the following steps:
S2-1: generating, by the transmitter, an I/Q domain high-dimensional precoding signal $\alpha(t+\Delta\tau)$ according to the synchronization time t and a transmission delay $\Delta\tau$ to the receiver:

$$\alpha(t+\Delta\tau) = \begin{bmatrix} \alpha_1(t+\Delta\tau) \\ \alpha_2(t+\Delta\tau) \\ \vdots \\ \alpha_M(t+\Delta\tau) \end{bmatrix}$$

wherein $\alpha_i(t+\Delta\tau)$ represents an $i^{th}$ dimension of the high-dimensional precoding signal, i=1, 2, . . . , M, M represents a number of dimensions of the high-dimensional precoding signal, and M does not exceed a number of the channel resources, $$\alpha_i(t+\Delta\tau) = \prod_{m=1}^{L} \exp[-j2\pi(k_m-1)\Delta f_m(t+\Delta\tau)]$$

wherein $j=\sqrt{-1}$, $1 \leq m \leq L$, L represents a number of I/Q domain precoding layers, $L \geq 1$, $k_m$ represents an index of an $m^{th}$ layer of I/Q domain precoding branches, $1 \leq k_m \leq M_m$, $M_m$ represents a number of the $m^{th}$ layer of I/Q domain precoding branches, $M_1 \times M_2 \times \ldots \times M_L = M$ and $$k_L + \sum_{m=1}^{L-1}\left[(k_m-1)\prod_{l=m+1}^{L} M_l\right] = i$$

are met, and $\Delta f_m$ represents a frequency increment of the $m^{th}$ layer;
S2-2: performing high-dimensional mapping on the original signal $s_0(t)$ to obtain a high-dimensional original signal s(t):

$$s(t) = \begin{bmatrix} s_1(t) \\ s_2(t) \\ \vdots \\ s_M(t) \end{bmatrix}, \sum_{i=1}^{M} s_i(t) = s_0(t)$$

wherein a number of dimensions of the high-dimensional original signal is M, and $s_i(t)$ represents an $i^{th}$ dimension of the high-dimensional original signal; and
S2-3: processing the high-dimensional original signal according to the I/Q domain high-dimensional precoding signal to obtain an I/Q domain pre-coded signal x(t):

$$x(t) = \begin{bmatrix} x_1(t) \\ x_2(t) \\ \vdots \\ x_M(t) \end{bmatrix} = \begin{bmatrix} s_1(t)\alpha_1(t+\Delta\tau) \\ s_2(t)\alpha_2(t+\Delta\tau) \\ \vdots \\ s_M(t)\alpha_M(t+\Delta\tau) \end{bmatrix}$$

wherein $x_i(t)$ represents an $i^{th}$ dimension of the I/Q domain pre-coded signal; and the phase domain precoding operation comprises the following steps:

S2-4: generating, by the transmitter, a phase domain high-dimensional precoding signal $\beta(t+\Delta\tau)$ according to the synchronization time t and a transmission delay $\Delta\tau$ to the receiver:

$$\beta(t+\Delta\tau) = \begin{bmatrix} \beta_1(t+\Delta\tau) \\ \beta_2(t+\Delta\tau) \\ \vdots \\ \beta_N(t+\Delta\tau) \end{bmatrix}$$

wherein $\beta_j(t+\Delta\tau)$ represents a $j^{th}$ dimension of the high-dimensional precoding signal, $j=1, 2, \ldots, N$, N represents a number of dimensions of the high-dimensional precoding signal, and M×N does not exceed the number of the channel resources, $$\beta_j(t+\Delta\tau) = \delta + \prod_{p=1}^{T} A_{p,n_p} \cos[2\pi(n_p-1)\Delta f_p(t+\Delta\tau)],$$

wherein T represents a number of phase domain precoding layers, $T \geq 1$, $1 \leq p \leq T$, $n_p$ represents an index of a $p^{th}$ layer of phase domain precoding branches, $1 \leq n_p \leq N_p$, $N_p$ represents a number of the $p^{th}$ layer of phase domain precoding branches, $$N_1 \times N_2 \times \ldots \times N_T = N \text{ and } n_T + \sum_{p=1}^{T-1}\left[(n_p-1)\prod_{l=p+1}^{T} N_l\right] = j$$

are met, $\Delta f_p$ represents a frequency increment of the $p^{th}$ layer, $A_{p,n_p}$ represents an amplitude of a precoding signal on a $n_p^{th}$ branch in the $p^{th}$ layer of phase domain precoding branches, and $\delta$ is a normal number agreed by the transmitter and the receiver in advance and has a value meeting $$\delta + \prod_{p=1}^{T} A_{p,n_p} \cos[2\pi(n_p-1)\Delta f_p(t+\Delta\tau)] > 0;$$

S2-5: performing phase domain high-dimensional mapping on a phase $\angle x_i(t)$ of the $i^{th}$ dimension of the I/Q domain pre-coded signal to obtain an $i^{th}$ high-dimensional phase signal $\angle x_i(t)$:

$$\angle x_i(t) = \begin{bmatrix} L x_{i,1}(t) \\ L x_{i,2}(t) \\ \vdots \\ L x_{i,N}(t) \end{bmatrix}, \sum_{k=1}^{N} L x_{i,k}(t) = L x_i(t) \bmod(2\pi)$$

wherein a number of dimensions of the high-dimensional phase signal is N, $\angle x_{i,k}(t)$ represents a $k^{th}$ dimension of the $i^{th}$ high-dimensional phase signal, $k=1, 2, \ldots, N$, and mod is a remainder function; and S2-6: processing the $i^{th}$ high-dimensional phase signal according to the phase domain high-dimensional precoding signal to obtain an $i^{th}$ phase domain pre-coded signal $\xi_i(t)$:

$$\xi_i(t) = \begin{bmatrix} \xi_{i,1}(t) \\ \xi_{i,2}(t) \\ \vdots \\ \xi_{i,N}(t) \end{bmatrix} = \begin{bmatrix} \exp[jLx_{i,1}(t)\beta_1(t+\Delta\tau)] \\ \exp[jLx_{i,2}(t)\beta_2(t+\Delta\tau)] \\ \vdots \\ \exp[jLx_{i,N}(t)\beta_N(t+\Delta\tau)] \end{bmatrix}$$

wherein $\xi_{i,k}(t)$ represents a $k^{th}$ dimension of the $i^{th}$ phase domain pre-coded signal, and combining, by the transmitter, the $i^{th}$ phase domain pre-coded signal into a phase domain pre-coded signal:

$$\xi(t) = \begin{bmatrix} \xi_1(t) \\ \xi_2(t) \\ \vdots \\ \xi_M(t) \end{bmatrix}.$$

5. The spatial position-dependent dual domain modulation method according to claim 4, wherein in S3, a specific process of the phase domain matching operation is as follows:

$$\hat{x}_i(t) = \exp\left\{j [\gamma_1(t) \ \gamma_2(t) \ \ldots \ \gamma_N(t)]\begin{bmatrix} \hat{\xi}_{i,1}(t) \\ \hat{\xi}_{i,2}(t) \\ \vdots \\ \hat{\xi}_{i,N}(t) \end{bmatrix}\right\} = \exp\left[j\sum_{k=1}^{N}\gamma_k(t)L\hat{\xi}_{i,k}(t)\right]$$

$$\hat{\xi}(t) = \begin{bmatrix} \hat{\xi}_1(t) \\ \hat{\xi}_2(t) \\ \vdots \\ \hat{\xi}_M(t) \end{bmatrix}, \hat{\xi}_i(t) = \begin{bmatrix} \hat{\xi}_{i,1}(t) \\ \hat{\xi}_{i,2}(t) \\ \vdots \\ \hat{\xi}_{i,N}(t) \end{bmatrix}$$

wherein $\hat{\xi}(t)$ represents a phase domain initial received signal, a superscript T represents transposition, $\gamma_j(t)$ represents a matched signal corresponding to $\beta_j(t+\Delta\tau)$ and has a value meeting $$\gamma_i(t)\left\{\delta + \prod_{p=1}^{T} A_{p,n_p}\cos[2\pi(n_p-1)\Delta f_p t]\right\} = 1 \bmod(2\pi), \hat{x}_i(t)$$

represents an $i^{th}$ dimension of the phase domain matched signal, and the phase domain matched signal is $\hat{x}(t)=[\hat{x}_1(t) \ \hat{x}_2(t) \ \ldots \ \hat{x}_M(t)]^T$;

a specific process of the I/Q domain matching operation is as follows:

$$\hat{s}_0(t) = [\alpha_1^*(t) \ \alpha_2^*(t) \ \ldots \ \alpha_M^*(t)]\begin{bmatrix} \hat{x}_1(t) \\ \hat{x}_2(t) \\ \vdots \\ \hat{x}_M(t) \end{bmatrix} = \sum_{i=1}^{M}\alpha_i^*(t)\hat{x}_i(t)$$

wherein $$\alpha_i^*(t) = \prod_{m=1}^{L}\exp[j2\pi(k_m-1)\Delta f_m t],$$

* represents conjugation, and $\hat{s}_0(t)$ represents an estimate for the original signal;

in S2-2, a high-dimensional mapping method comprises:
a first method $$s_i(t) = \frac{1}{M} s_0(t);$$

and
a second method:

$$s_i(t) = \frac{1}{M} s_0(t) + n_i(t),$$

wherein $n_i(t)$ is an $i^{th}$ I/Q domain random offset signal and meets that $[n_1(t)\ n_2(t)\ \ldots\ n_M(t)]^T$ is located in a solution space of an equation $$\sum_{i=1}^{M} n_i(t) = 0;$$

and in S2-5, a phase domain high-dimensional mapping method comprises:
a first method:

$$\angle x_{i,k}(t) = \frac{1}{N} \angle x_i(t);$$

and
a second method:

$$\angle x_{i,k}(t) = \frac{1}{N} \angle x_i(t) + \theta_k(t),$$

wherein $\theta_k(t)$ is a $k^{th}$ phase domain random offset signal and meets that $[\theta_1(t)\ \theta_2(t)\ \ldots\ \theta_N(t)]^T$ is located in a solution space of an equation $$\sum_{k=1}^{N} \theta_k(t) = 0.$$

6. A position-based multiple access communication method, based on a transmitter, a receiver and a plurality of channel resources, wherein the transmitter is configured to process and transmit an original signal, the receiver is configured to recover the original signal, the channel resources are used for the transmitter and the receiver, the channel resources comprise time-domain, frequency-domain, space-domain and code-domain resources, and the method comprises the following steps:

S1: performing a time synchronization on the transmitter and several users to obtain a synchronization time t;

S2: mapping, by the transmitter, an original signal of a $u^{th}$ user to a $u^{th}$ high-dimensional original signal, wherein the $u^{th}$ high-dimensional original signal is as follows:

$$s(u, t) = \begin{bmatrix} s_1(u, t) \\ s_2(u, t) \\ \vdots \\ s_M(u, t) \end{bmatrix}, s_1(u, t) = s_2(u, t) = \ldots = s_M(u, t) = \frac{s_0(u, t)}{\sqrt{M}}$$

wherein $s_0(u, t)$ is the original signal of the $u^{th}$ user, $s_i(u, t)$ is an $i^{th}$ dimension of the $u^{th}$ high-dimensional original signal, i=1, 2, ..., M, and M is a dimension of the $u^{th}$ high-dimensional original signal and has a value equal to a number of the channel resources;

S3: performing, by the transmitter, I/Q domain precoding on the $u^{th}$ high-dimensional original signal to generate a $u^{th}$ high-dimensional transmission signal, wherein the I/Q domain precoding process is as follows:

$$x(u, t) = \begin{bmatrix} x_1(u, t) \\ x_2(u, t) \\ \vdots \\ x_M(u, t) \end{bmatrix} = \begin{bmatrix} s_1(u, t)\alpha_1(u, t + \Delta\tau_u) \\ s_2(u, t)\alpha_2(u, t + \Delta\tau_u) \\ \vdots \\ s_M(u, t)\alpha_M(u, t + \Delta\tau_u) \end{bmatrix}$$

wherein $x(u, t)$ represents the $u^{th}$ high-dimensional transmission signal, $x_i(u, t)$ represents an $i^{th}$ dimension of the $u^{th}$ high-dimensional transmission signal, $\alpha_i(u, t+\Delta\tau)$ represents an $i^{th}$ dimension of a $u^{th}$ precoding signal, i=1, 2, ..., M, and $\Delta\tau_u$ represents a transmission delay from the transmitter to the $u^{th}$ user;

S4: summing, by the transmitter, all the $u^{th}$ high-dimensional transmission signals to obtain a high-dimensional total transmission signal:

$$\tilde{x}(t) = \sum_{u=1}^{U} x(u, t)$$

wherein U represents a number of users; broadcasting, by the transmitter, the high-dimensional total transmission signal to a plurality of users by using the channel resources, each of the channel resources transmitting one dimension of the high-dimensional total transmission signal; and S5: receiving, by the $u^{th}$ user, the high-dimensional total transmission signal to obtain a high-dimensional total receiving signal, and performing an I/Q domain matching operation on the high-dimensional total receiving signal to obtain an estimate $\hat{s}_0(u, t)$ for a $u^{th}$ original signal.

7. The position-based multiple access communication method according to claim 6, wherein in S3, the $u^{th}$ precoding signal is as follows:

$$\alpha(u, t + \Delta\tau) = \begin{bmatrix} \alpha_1(u, t + \Delta\tau_u) \\ \alpha_2(u, t + \Delta\tau_u) \\ \vdots \\ \alpha_M(u, t + \Delta\tau_u) \end{bmatrix},$$

and
the $i^{th}$ dimension of the $u^{th}$ precoding signal is as follows:

$$\alpha_i(u, t + \Delta\tau_u) = \prod_{m=1}^{L} \exp(-j2\pi(k_m - 1)\Delta f_m(t + \Delta\tau_u))$$

wherein, L represents a number of I/Q domain precoding layers, L≥1, $k_m$ represents an index of an $m^{th}$ layer of I/Q domain precoding branches, $1 \leq k_m \leq M_m$, $M_m$ represents a number of the $m^{th}$ layer of I/Q domain precoding branches, $M_1 \times M_2 \times \ldots \times M_L = M$ and $$k_L + \sum_{m=1}^{L-1}\left[(k_m - 1)\prod_{l=m+1}^{L} M_l\right] = i$$

are met, and $\Delta f_m$ represents a frequency increment of the $m^{th}$ layer.

8. The position-based multiple access communication method according to claim 7, wherein in the step S5, the I/Q domain matching operation is as follows:

$$\hat{\tilde{x}}(t) = \begin{bmatrix} \tilde{x}_1(t) \\ \tilde{x}_2(t) \\ \vdots \\ \tilde{x}_M(t) \end{bmatrix}$$

$$\hat{s}_0(u, t) = \sum_{i=1}^{M} \alpha_i^*(u, t)\hat{\tilde{x}}_i(t)$$

wherein $\alpha_i^*(u, t)$ represents an $i^{th}$ dimension of a $u^{th}$ matched signal, $\hat{\tilde{x}}(t)$ represents the high-dimensional total receiving signal, and $\hat{\tilde{x}}_i(t)$ represents an $i^{th}$ dimension of the high-dimensional total receiving signal;

the $u^{th}$ matched signal is as follows:

$$\alpha^*(u, t) = \begin{bmatrix} \alpha_1^*(u, t) \\ \alpha_2^*(u, t) \\ \vdots \\ \alpha_M^*(u, t) \end{bmatrix},$$

and the $i^{th}$ dimension of the $u^{th}$ matched signal is as follows:

$$\alpha_i^*(u, t) = \prod_{m=1}^{L} \exp(j2\pi(k_m - 1)\Delta f_m t).$$

\* \* \* \* \*